(12) United States Patent
Hogan

(10) Patent No.: US 6,195,726 B1
(45) Date of Patent: Feb. 27, 2001

(54) METHOD AND APPARATUS FOR PERFORMING PATTERNED READ AND WRITE OPERATIONS

(75) Inventor: Joshua N. Hogan, Los Altos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/275,286

(22) Filed: Mar. 24, 1999

(51) Int. Cl.$^7$ ..................................................... G06F 12/02
(52) U.S. Cl. .............................. 711/112; 711/4; 711/157; 386/35; 386/36; 386/40; 386/45; 386/49; 386/50
(58) Field of Search ..................................... 711/4, 5, 112, 711/114, 157; 386/35, 36, 40, 45, 49, 50

(56) References Cited

U.S. PATENT DOCUMENTS 5,533,103 * 7/1996 Peavey et al. ........................... 379/69
5,895,124 * 4/1999 Tsuga et al. ............................ 386/98

* cited by examiner

Primary Examiner—Hiep T. Nguyen

(57) ABSTRACT

A read/write drive such as a DVD+RW drive performs interleaved read and write operations on a recordable medium without relying on long seeks. During a first mode of operation, the read/write drive writes a pattern of data units (e.g., blocks) separated by gaps. Each gap spans the length of at least one data unit. During a second mode of operation, read and write operations are interleaved. At least some of the recorded data units in the pattern are read during the second mode, and new data units are written to gaps within short seeks of data units read during the second mode.

19 Claims, 4 Drawing Sheets

METHOD AND APPARATUS FOR PERFORMING PATTERNED READ AND WRITE OPERATIONS

BACKGROUND OF THE INVENTION

The invention relates generally to data storage. More specifically, the invention relates to a method and apparatus for simultaneously reading and writing data to quasi-random access memory.

A typical computer may use different types of memory for storing data. It may use random access memory such as DRAMs and SRAMs. It may use sequential memory such as magnetic tape. It may use quasi-random access memory such as "read/write" optical discs.

Read/write optical discs include discs that allow new data to be written only once and discs that allow new data to be written many times. A DVD+RW disc is one type of read/write disc that allows new data to be written many times.

Read/write drives can write data to read/write optical discs. A typical read/write drive includes an optical pickup unit that is moved radially along the disc. The optical pickup unit, in turn, includes a laser, an optics assembly (including a focusing lens) and a photodetection system.

A read/write drive typically has a read mode of operation and at least one of the following write modes of operation: a write-append mode and an insert-edit mode. The write-append mode allows new data to be appended to previously written data on the read/write disc, and the insert-edit mode allows previously written data to be overwritten with new data.

During read and write operations, the optical pickup unit is moved to a target location where data is to be read or written. Movement to the target location may be characterized as a "short seek" or a "long seek." Short seeks are typically performed by displacing the focusing lens via an electro-mechanical actuator. Long seeks are typically performed by displacing the entire optical pickup unit via a sled assembly. Seeks performed via the electro-mechanical actuator are performed much faster than seeks performed via the sled assembly.

Data can be written "simultaneously" to the optical disc by interleaving the read and write operations. For instance, read and write operations may be performed simultaneously by reading data at a first location, performing a seek to a second location, writing data at the second location, performing a seek to a third location, reading data at the third location, performing a seek to a fourth location, writing data at the fourth location, and so on. Whether the electro-mechanical actuator or sled assembly is used for the seek depends upon the distance to the target location.

A latency time is associated with each seek operation. Since performing a seek via the actuator is much faster than performing a seek via the sled assembly, long seeks typically have much higher latency times than short seeks. The much longer latency times of the long seeks can make it difficult to perform interleaved read and write operations.

There is a need to minimize the latency times while performing interleaved read and write operations.

SUMMARY OF THE INVENTION

The invention avoids the use of long seeks during interleaved read and write operations. During a first mode of operation, a pattern of data units (e.g., one or more data blocks, one or more GOPs) separated by gaps is written to a recordable medium. Each gap spans the length of at least one data unit. Read and write operations are interleaved during a second mode of operation. At least some of the recorded data units in the pattern are read during the second mode, and new data units are written to gaps within short seeks of data read during the second mode.

Interleaving the read and write operations in such a manner reduces or eliminates the use of long seeks. Thus, latency times are reduced without having to make expensive hardware modifications to increase the speed of performing the long seeks.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
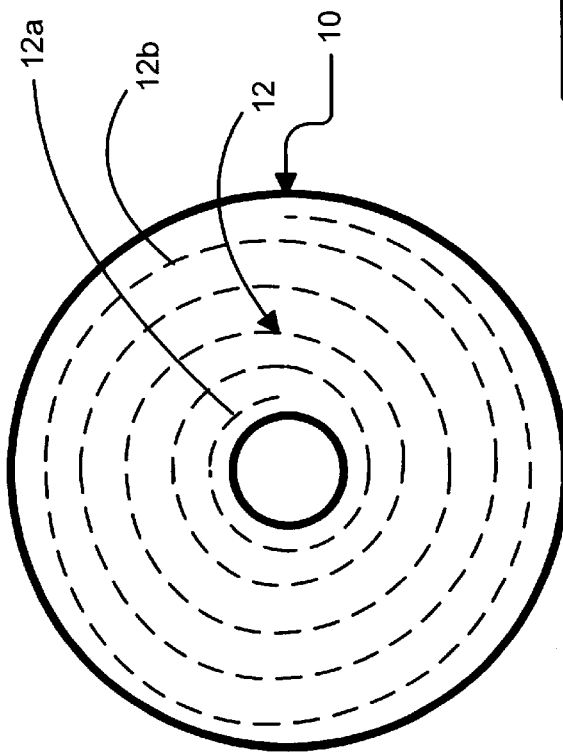
FIG. 1 is an illustration of a DVD disc.

As shown in the drawings for purposes of illustration, the present invention is embodied in systems that can perform interleaved read and write operations. Each system can store data in a pattern that reduces or eliminates the use of long seeks when read and write operations are interleaved. In the paragraphs that follow, the invention will be described in connection with a DVD system. First, a brief description of a DVD read/write disc will be provided. Next, descriptions of a computer system including a DVD drive and a DVD player will be provided.

Then two exemplary applications for the DVD player will be described. In one exemplary application, the DVD player records two television programs simultaneously.

In the other exemplary application, the DVD player records a television program and simultaneously plays back earlier-recorded portions of the television program. Such a playback/record feature could be particularly desirable. For instance, it would allow a viewer to pause a television program, walk away from the television and do something else (e.g., answer a phone call), return to the television after a period of time, and resume viewing the program at the point where the program was paused. The DVD player would record a first portion while the viewer was away. When the viewing was resumed, the DVD player would begin playing back the first portion. However, the DVD player would still continue recording the program (the "second portion"). After the first portion was played back, the DVD player would seamlessly begin playing back the second portion to allow the viewer to watch the remainder of the program, uninterrupted. During playback of the second portion, the DVD player would still continue recording the program. This is made possible, in part, by the quasi-random access nature of the DVD disc.

A viewer using a VCR, on the other hand, would not be able to resume watching the program at the point where the program was paused. The viewer would have the option of recording the entire program, waiting several minutes or hours for the program to end, rewinding the VCR, and then resume viewing at the point where the program was paused. Another option would be to record the portion during the pause, return from the activity, turn off the VCR, resume watching the program, and perhaps view the recorded portion after the program has ended. Neither option for using the VCR would be as desirable or convenient as the playback/record feature offered by the DVD player according to the present invention.

FIG. 1 shows a DVD read/write disc 10, hereinafter referred to as the disc 10. A spiral groove 12 is embedded in the disc 10. The groove 12 starts at an inner track 12a and ends at an outer track 12b. Data may be recorded in the groove 12 or in both the groove 12 and land, depending upon the DVD format. The disc 10 is a surface recording medium, which has quasi-random access characteristics. Data recorded on the disc 10 cannot be accessed as fast as data stored in random access memory, but it can be accessed faster than data stored in sequential memory (e.g., tape).

Figure 3:
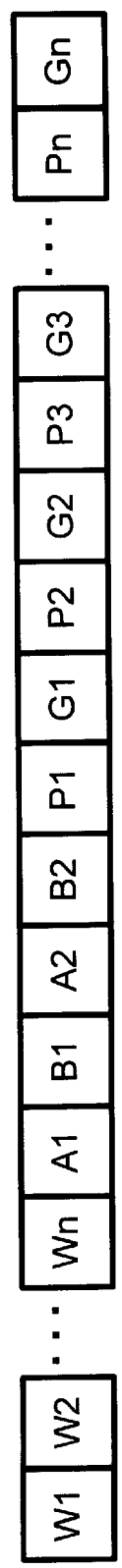
FIG. 3 is an illustration of a data storage pattern according to the present invention.
Figure 2:
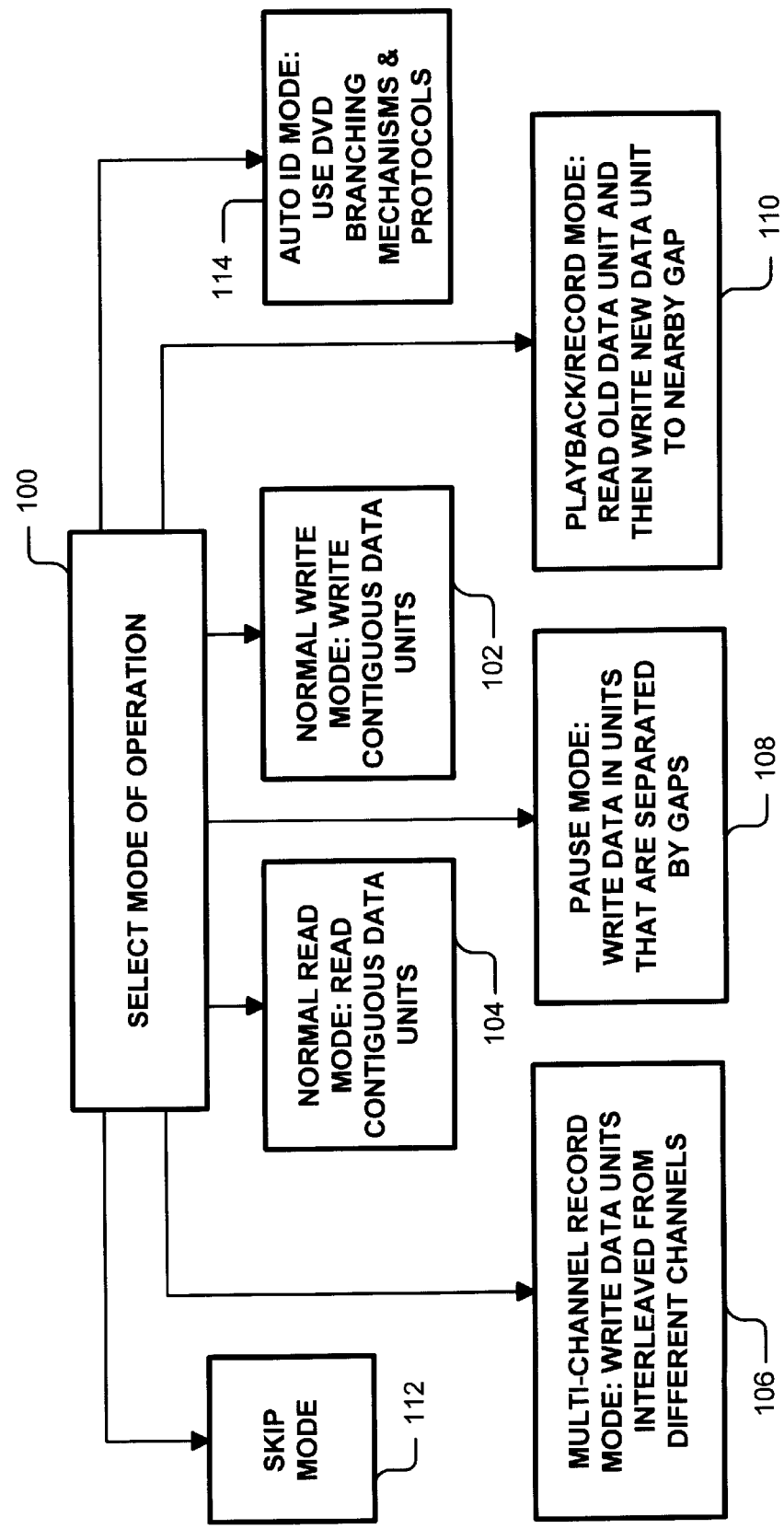
FIG. 2 is a flowchart of various methods for performing read and write operations in accordance with the present invention.

Reference is now made to FIGS. 2 and 3, which illustrate various read and write operations that may be performed on the disc 10. To perform an operation on the disc 10, a mode of operation is selected (block 100). Five modes of operation will be described: a "normal read" mode of operation, a "normal write" mode of operation, a "pause" mode of operation, a "playback/record" mode of operation, and a "multi-channel record" mode of operation.

Read and write operations will be described in connection with units of data or "data units." A data unit could be a single block of data, more than one block of data, a single Group of Pictures ("GOP"), more than one GOP, etc.

When the normal write mode is selected (block 102), contiguous data units are written to the disc 10. For example, contiguous data blocks W1, W2, . . . , Wn could be written to the disc 10 as illustrated in FIG. 3.

When the normal read mode is selected (block 104), data units already stored on the disc 10 are read. For example, the blocks W1, W2, . . . , Wn could be read contiguously, starting at block W1 and finishing at block Wn.

When the multi-channel record mode (106) is selected, data units from multiple sources are interleaved, and the interleaved data units are written to the disc 10. For example, data units A1, A2., . . . , An from a first source could be interleaved with data units B1, B2, . . . , Bn from a second source, and the interleaved data units A1, B1, A2, B2, . . . , An, Bn could be written to the disc 10 in the pattern illustrated in FIG. 3. Such interleaving allows data from multiple sources to be recorded simultaneously. The advantages of the multi-channel write mode will become apparent below.

When the pause mode is selected (block 108), data is written in a pattern of one or more data units that are separated by gaps. Each gap covers the length of at least one data unit. For example, data units P1, P2, P3, . . . , Pn could be separated by gaps G1, G2, G3, . . . , Gn in the pattern illustrated in FIG. 3 (data unit P1, gap G1, data unit P2, gap G2, data unit P3, gap G3, . . . , data unit Pn, gap Gn). Each gap G1, G2, G3, . . . , Gn shown in FIG. 3 has a length similar to the length of a data unit P1, P2, P3, . . . , Pn.

When the playback/record mode is selected (block 110), at least some of the previously recorded ("old") data units are read from the disc 10 while "new" data units are "simultaneously" written to the disc 10.

The reading starts with a data unit that was written during the pause mode. For example, data unit P1 is read first when the playback/record mode begins. After data unit P1 has been read, new data is written to a gap within a short seek (e.g., to gap G1). Then old data is read from the data unit P2, new data is written to the gap G2, old data is read from the data unit P3, new data is written to the gap G3, and so on. Such interleaving continues until another mode is selected.

Thus far during the playback/record mode, only high speed short seeks have been used to traverse the short distances between the read and write locations. The use of slower long seeks has been eliminated. Eliminating the use of the long seeks enables the read and write operations to be interleaved during the playback/record mode.

Depending upon the intended usage of the disc 10 (e.g., recording a television program), several gigabytes of data might be recorded during the pause mode. Consequently, the data unit (e.g., data unit P1) recorded at the beginning of the pause mode might be located near the inner track 12a while the data unit (e.g., data unit Pn) recorded at the end of the pause mode might be located near the outer track 12 of the disc 10. When the playback mode is selected, a movement from the outer track 12b towards the inner track 12a would begin. A long seek could be performed to move from the outer track 12b to the inner track 12a.

Figure 4:
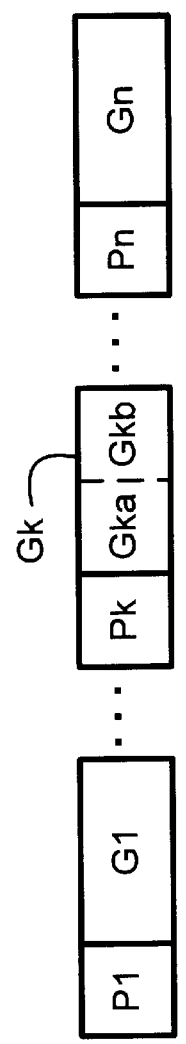
FIG. 4 is an illustration of another data storage pattern according to the present invention.

However, a long seek could be avoided if, for example, the gaps G1, . . . , Gk, . . . , Gn are at least twice the length of the data units P1, . . . , Pk, . . . , Pn (as illustrated in FIG. 4). Movement towards the inner track 12a would be performed in a series of short seeks. At the end of each short seek, a data unit would be written to half of a gap (e.g., gap Gka). The other half Gkb of the gap Gk would still be empty. Later, a data unit could be written to the empty half Gkb of the gap Gk after a data unit has been read from block Pk. Thus, data units may be written to one or more gaps during movement from the outer track 12b to the inner track 12a. Consequently, a long seek is avoided.

More elaborate implementations could be used if the gaps G1, . . . , Gk, . . . , Gn are three or four times the length of the data units P1, . . . , Pk, . . . , Pn. This would allow skipping "uninteresting" portions that have been recorded. Having larger gaps would ensure that there is always an opportunity to record within a short seek.

Figure 5:
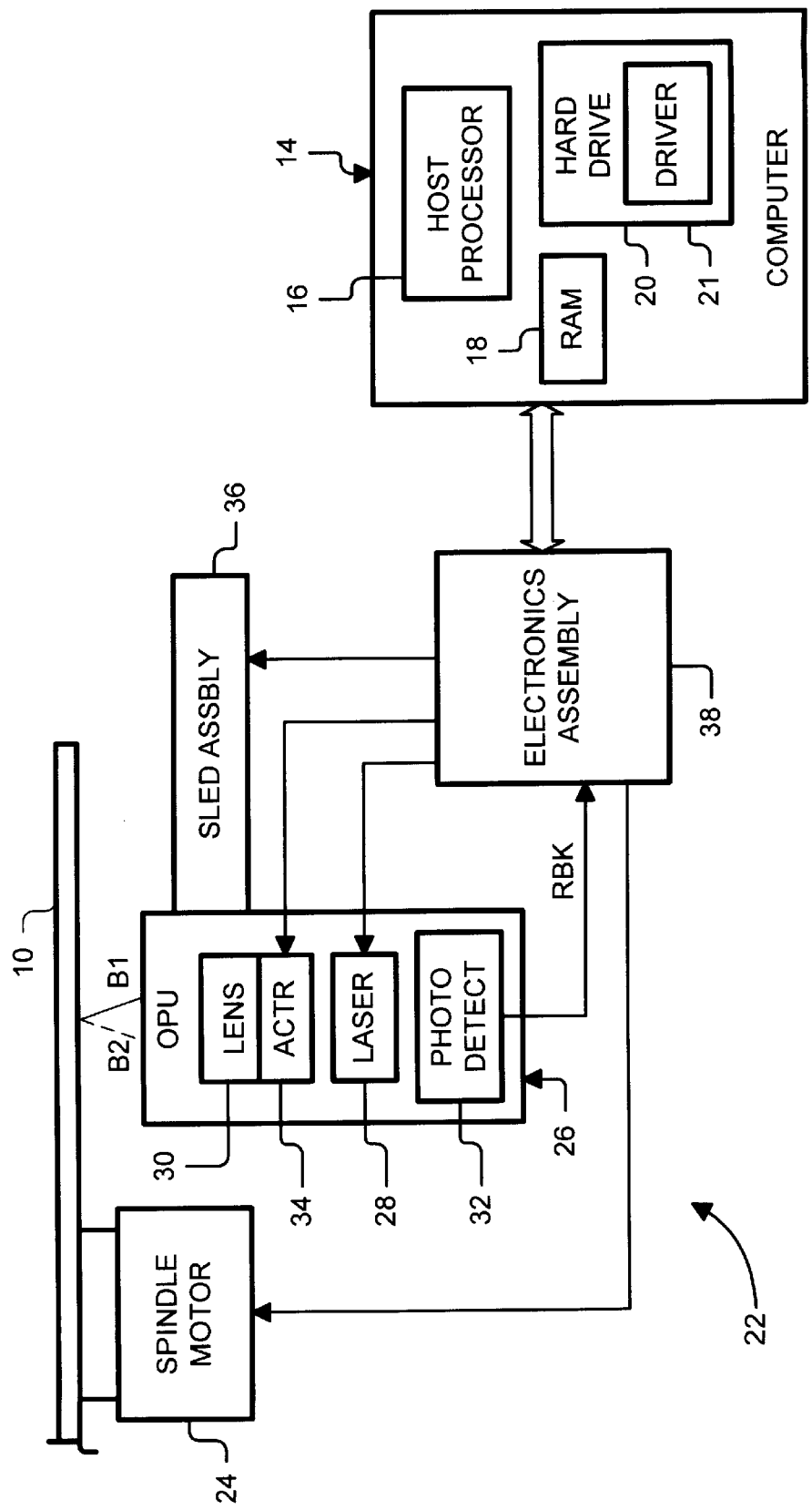
FIG. 5 is a block diagram of a computer system according to the present invention, the computer system including a central processing unit, memory and a DVD read/write drive.

FIG. 5 shows a disc 10 and a computer system 14 including a host processor (e.g., a central processing unit) 16, random access memory 18, long term memory (e.g., a hard drive) 20, and a read/write DVD drive 22. The DVD drive 22 follows a DVD format specification such as the DVD+RW format specification.

The host processor 16 can command the DVD drive 22 to operate in the normal read, normal write, multi-channel record, pause and playback/record modes of operation. When the host processor 16 commands the DVD drive 22 to operate in the normal write mode, the host processor 16 sends contiguous data units to the DVD drive 22. When the host processor 16 commands the DVD drive 22 to operate in the multi-channel record mode, the host processor 16 interleaves data units from the first and second sources and sends the interleaved data units to the DVD drive 22. When the host processor 16 commands the DVD drive 22 to operate in the pause mode, the host processor 16 may interleave data units with empty files (i.e., gaps) and send the interleaved data units/empty files to the DVD drive 22. When the host processor 16 commands the DVD drive 22 to operate in the normal read mode, the host processor 16 sends requests to receive files from the DVD drive 22. When the host processor 16 commands the DVD drive 22 to operate in the playback/record mode, the host processor 16 sends requests to receive files from the DVD drive and also sends data units to be written to gaps within short seeks of the requested files.

The host processor 16 is instructed to interface with the DVD drive 22 via a driver 21 that is typically stored in the long term memory 20 and loaded into the RAM 18 during normal operation of the computer 14. The driver 21 is essentially a software program including a plurality of executable instructions.

In such a system 14, the DVD drive 22 may be a "dumb" unit. That is, all of the intelligence for performing the read and write operations may be contained in the computer system 14.

The DVD drive 22 includes a spindle motor 24 for rotating the disc 10. The DVD drive 22 further includes an optical pickup unit 26, which typically includes a laser 28 for generating a laser beam B1; a focusing lens 30 between the last and the disc 10, and a photodetection system 32 for detecting a reflected beam B2. The photodetection system 32 generates a readback signal RBK carrying data and timing/addressing information.

The lens 30 is movable by an electro-mechanical actuator 34 (e.g., a voice coil motor) to perform short seeks. The optical pickup unit 26 is movable by a sled assembly 36 to perform long seeks.

The spindle motor 24, the electro-mechanical actuator 34 and the sled assembly 36 are controlled by an electronics assembly 38. The laser 28 of the optical pickup unit 26 is driven by a laser driver (not shown), which is part of the electronics assembly 38. The electronics assembly 38 processes the readback signal RBK to obtain addressing information, control the timing of the laser driver, and control the electro-mechanical actuator 34 and sled assembly 36.

The electronics assembly 38 also responds to operation mode commands from the host processor 14 and maps the locations of files stored on the disc 10. When the electronics assembly 38 is commanded to perform a read operation, it causes the optical pickup unit 26 to generate a readback signal RBK carrying data units requested by the host processor 14. The electronics assembly 38 typically recovers the requested data from the electrical signal RBK, demodulates the recovered data, arranges the demodulated data in error correction code ("ECC") blocks, and performs error correction on the ECC blocks. The error-corrected data is sent to the host processor 14.

When the electronics assembly 38 is commanded to perform a write operation, it receives data from the host processor 14, typically buffers the data, performs ECC encoding on blocks of the buffered data, modulation-encodes the ECC-encoded blocks, and causes the optical pickup unit 26 to write the modulation-encoded data to the disc 10.

Figure 6:
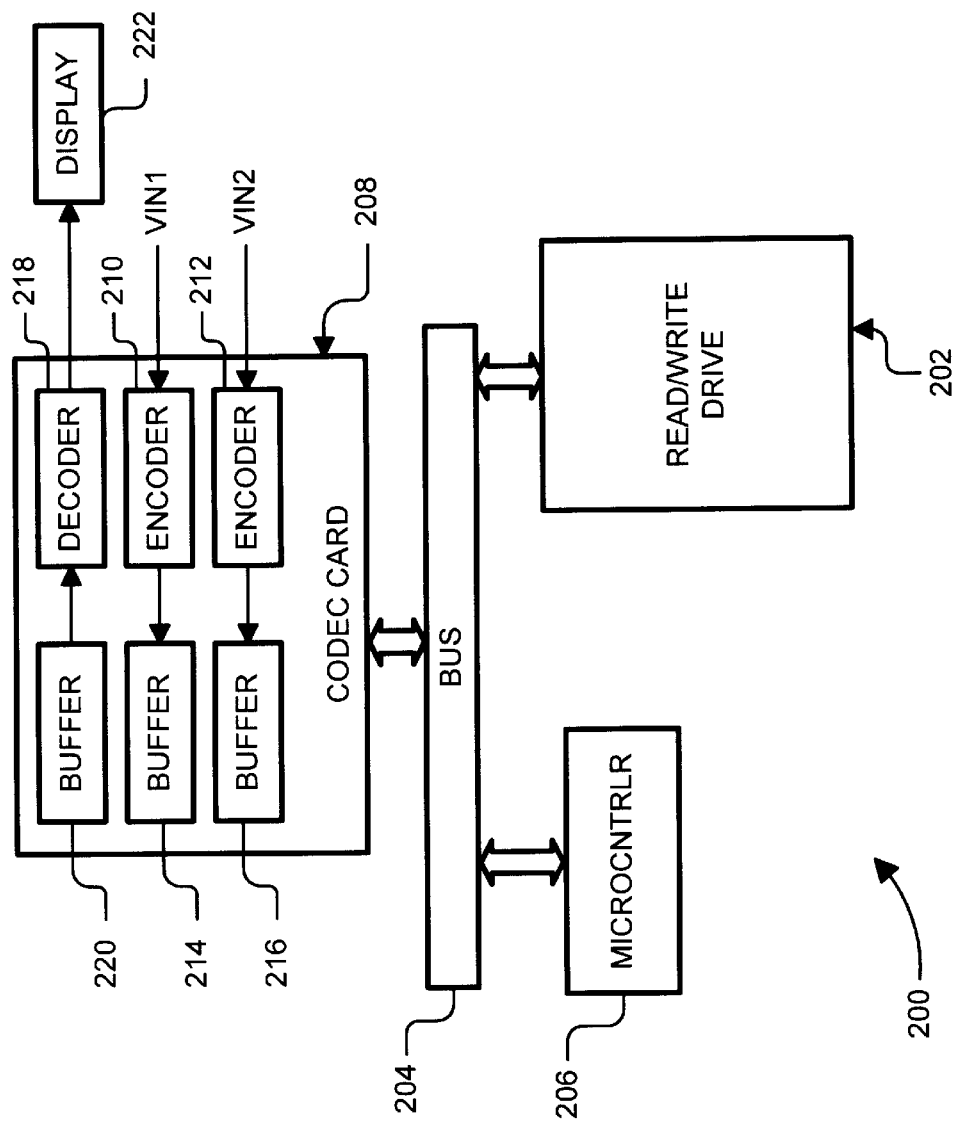
FIG. 6 is a block diagram of a DVD player according to the present invention, the DVD player including a microcontroller, a DVD read/write drive and a codec card.

Reference is now made to FIG. 6, which shows a DVD player 200 having an output jack for a video display signal VOUT and input jacks for first and second incoming video signals VIN1 and VIN2. The DVD system 200 includes a DVD drive 202 that has the ability to read and write to the disc 10 with sufficient speed to support two video streams with a minimum amount of buffer memory. Drives of 2X or higher are preferred.

The DVD player 200 further includes a data bus 204, a microcontroller 206 connected to the bus 202, and a codec card 208 connected to the bus 204. The microcontroller 206 may include a dedicated processor and a ROM encoded with an operating program that instructs the dedicated processor to operate the DVD drive 202 in the normal read, normal write, multi-channel record, pause and playback/record modes.

The codec card 208 includes first and second encoders 210 and 212 for encoding the incoming video signals VIN1, VIN2 according to a format such as MPEG. The first encoder 210 stores a compressed video stream in a first buffer 214, and the second encoder 212 stores a compressed video stream in a second buffer 216.

The codec card 208 further includes a decoder 218, which performs decompression according to a format such as MPEG. A compressed stream read by the DVD drive 202 is buffered in a third buffer 220 and decompressed by the decoder 218. The decoder 218 outputs a signal VOUT carrying uncompressed data, which is sent directly to a video monitor 222.

The compressed video streams include GOPs. Therefore, each data unit read and written by DVD drive 202 may include one or more GOPs.

During the normal read mode, the microcontroller 206 commands the DVD drive 202 to read a compressed video stream from the disc 10 and store the compressed video stream in the third buffer 220 (via the bus 204). The microcontroller 206 then commands the decoder 218 to decompress the video stream stored in the third buffer 220 and send a signal VOUT carrying a decompressed video stream to the video monitor 222.

During the normal write mode, the microcontroller 206 commands the first encoder 210 to compresses the first video signal VIN1 and store a compressed video stream in the first buffer 214. Then the microcontroller 206 commands the DVD drive 202 to write the compressed video stream to the disc 10.

During the multi-channel record mode, the microcontroller 206 causes both encoders 210 and 212 to compress the incoming video signals VIN1 and VIN2 and store compressed video streams in the first and second buffers 214 and 216. The microcontroller 206 interleaves GOPs stored in first buffer 216 with GOPs stored in the second buffer 216. Then the microcontroller 206 commands the DVD drive 202 to write the interleaved GOPs to the disc 10.

The multi-channel record mode allows the DVD player 200 to simultaneously record two television programs. A first television signal (i.e., VIN1) is supplied to the first input jack of the DVD player 200 and a second television signal (i.e., VIN2) is supplied to the second input jack of the DVD player 200.

During the pause mode, the microcontroller 206 commands the first encoder 210 to compress the first video signal VIN1 and store a compressed video stream in the first buffer 214. The microcontroller 206 then interleaves empty files with GOPs stored in the first buffer 214. The empty files may be at least as long as a typical GOP or largest GOP. The microcontroller 206 then commands the DVD drive 202 to write the interleaved GOPs/empty files to the disc 10.

During the playback/record mode, the microcontroller 206 commands the first encoder 210 to compress the first incoming video signal VIN1 and store a compressed video stream in the first buffer 214. The microcontroller 206 also commands the DVD drive 202 to read GOPs from the disc and simultaneously write buffered GOPs to the disc 10. The buffered GOPs are written to gaps within a short seek of the GOPs that are read. The GOPs read from the disc 10 are stored in the third buffer 218 and decompressed by the decoder 220. A signal VOUT carrying a decompressed video stream is sent to the video monitor 222 for display.

The pause and playback/record modes allow a viewer to pause a television program and walk away from the television set and do something else (e.g., answer a phone call). The viewer need only select the pause mode before walking away. When the pause mode is selected, the DVD player 200 begins recording the television program. Upon returning to the television set, the viewer selects the playback/record mode. The DVD player 200 begins displaying the video recorded during the pause mode and simultaneously starts recording "live" video. Throughout the remainder of the television program, the DVD player 200 operates in the playback/record mode. Once the portion recorded during the pause mode has been displayed, the DVD player 200 begins seamlessly displaying the portion recorded during the playback/record mode. Thus, the viewer watches an uninterrupted television program. During the playback/record mode, the viewer would no longer be watching a "live" broadcast; there would be an initial delay equal to the length of time that the television program was paused.

For instance, the system 200 would allow a viewer to pause a football game in the middle of a passing play, while the football is in mid-air. The viewer could walk away, return to the television set fifteen minutes later, and watch the football fall into the arms of a receiver. Moreover, the viewer, would be able to watch the rest of the game uninterrupted.

The performance of the codec card 208 can be optimized if, for example, an encoder 210, 212 switches to a higher data rate constant bit rate mode which does not use bi-directional frames (the B frames in the IPB sequence). This reduces the encoder memory requirements and reduces encoder processing burden, which frees up memory and processing for the decoder 218. The constant bit rate also simplifies the interleaving.

The DVD player 200 could be provided with other features. For example, the DVD player 200 could be provided with a "skip" mode of operation 112 (see FIG. 2). The skip mode would allow the viewer to skip through recorded portions of the program and catch up with the live broadcast. Additionally, the skip mode would allow the viewer to skip through uninteresting portions that have been recorded. Short seeks could be used to skip the uninteresting portions. The skip mode could be entered manually.

The DVD player 200 could take advantage of existing DVD branching mechanisms and protocols such as those already used for "parental control." This would facilitate automatic identification of "program segments" and assist in deleting or skipping through uninteresting portions that have been recorded. The branching mechanisms and protocols could be used during the normal write mode 102, the normal read mode 104, the multi-channel record mode 106, the pause mode 108, and the playback/record mode 110, and it could be used in a separate "auto identification" mode 114 (see FIG. 2).

Thus disclosed is a system that allows a viewer to pause a program and later resume watching the program at the point where the program was paused. Such a mode of operation is particularly attractive for live events such as televised sporting events. This option is not available on known VCRs.

More generally, however, read and write operations are interleaved in a manner that reduces or eliminates long seeks. Thus, average latency time of interleaved read and writes is reduced without having to make expensive hardware modifications to increase the speed of long seeks.

Although the invention was described above in connection with a DVD drive, it is not so limited. The invention could be applied to other types of quasi-random access memory.

The invention is not limited to the specific embodiments described and illustrated above. Data units are not limited to data blocks or GOPs. If a compression format other than MPEG is used, the data units could correspond to units generated by the other compression format. The data storage pattern is not limited to the patterns shown in FIGS. 3 and 4.

The data units may be separated by gaps in ways other than interleaving data units with empty files. For example, instead of interleaving data units and empty files, the host processor may send data units, gap sizes, and appropriate address information indicating starting addresses of the gaps. The gap starting addresses and gap sizes could be used to separate the data units.

Instead of including first and second encoders, the codec card could include a single encoder that interleaves the first and second incoming video signals. If the incoming video signals are already encoded (e.g., MPEG-encoded), the single encoder or first and second encoders could be eliminated from the codec card.

Accordingly, the invention is not limited to the specific embodiments described and illustrated above. Instead, the invention is construed according to the claims that follow.

What is claimed is:

1. A method of performing read and write operations on a recordable data storage medium, the method comprising the steps of:
    writing a pattern of data units separated by gaps during a first mode of operation, each gap spanning the length of at least one data unit; and
    interleaving read and write operations during a second mode of operation, at least some of the recorded data units in the pattern being read during the second mode, new data units being written to gaps within short seeks of data units read during the second mode.

2. The method of claim 1, wherein each data unit includes at least one Group of Pictures (GOP).

3. The method of claim 1, wherein each data unit includes at least one block of data.

4. The method of claim 1, wherein the gaps are at least twice the length of the data units.

5. The method of claim 4, wherein a first location is written to during the first mode; wherein a transition period begins when the second mode is commanded, the transition period ending when the first location is accessed during the second mode; and wherein data units are written to portions of intermediate gaps during the transition period such that at least one short seek may be performed during the transition period.

6. The method of claim 1, further comprising the steps of:
    encoding an incoming video signal, wherein the encoded video signal is written to the recordable storage medium in the pattern during the second mode; and
    decoding data units that are read from the medium during the second mode; whereby the encoding and decoding steps are duplexed during the second mode.

7. The method of claim 6, wherein the video signal is encoded without using bi-directional frames.

8. The method of claim 1, further comprising the step of skipping through selected data units.

9. The method of claim 1, further comprising the step of using DVD branching mechanisms and protocols to perform the operations.

10. Apparatus comprising:

a processor; and a read/write drive responsive to the processor;

the processor separating data units by gaps during a first mode of operation, each gap spanning the length of at least one data unit, the processor causing the read/write drive to write the separated data units during the first mode;

the processor having the separated data units read by the read/write drive during a second mode of operation, the processor causing the read/write drive to write data units to gaps within short seeks of the data units read during the second mode.

11. The apparatus of claim 10, wherein the processor separates the data units by interleaving the data units with empty files, the interleaved files/data units being written during the first mode.

12. The apparatus of claim 10, wherein the gaps are at least twice the length of the data units.

13. The apparatus of claim 12, wherein a first location is written to during the first mode; wherein a transition period begins when the second mode is commanded, the transition period ending when the first location is accessed during the second mode; and wherein data units are written to portions of intermediate gaps during the transition period such that at least one short seek may be performed during the transition period.

14. The apparatus of claim 10, further comprising:

an encoder for encoding an incoming video signal, wherein the encoded video signal is written to a medium in the pattern during the second mode; and a decoder for decoding data units that are read from the medium during the second mode.

15. The apparatus of claim 14, wherein the encoder encodes the video signal without using bi-directional frames.

16. The apparatus of claim 10, wherein the processor skips selected data units.

17. The apparatus of claim 10, wherein the processor uses DVD branching mechanisms and protocols to perform the operations.

18. Apparatus for recording an incoming signal during a first mode of operation and for simultaneously recording and playing the signal during a second mode of operation, the apparatus comprising:

means for separating data units of the incoming signal by gaps during the first mode, each gap spanning the length of at least one data unit;

means for writing the separated data units during the first mode;

means for reading at least some of the separated data units during the second mode; and means for writing data units of the incoming signal to gaps within short seeks of the data read during the second mode;

whereby read and write operations are interleaved during the second mode.

19. An article of manufacture for a read/write system, the system including a processor and a read/write drive, the system having first and second modes of operation, the article comprising:

computer memory; and a program encoded in the memory, the program, when executed, causing the processor to:

separate data units of the incoming signal by gaps during the first mode, each gap spanning the length of at least one data unit;

write the separated data units during the first mode;

read at least some of the separated data units during the second mode; and write data units of the incoming signal to gaps within short seeks of the data read during the second mode;

whereby read and write operations are interleaved during the second mode.

\* \* \* \* \*